United States Patent
Guan et al.

(10) Patent No.: US 8,345,388 B2
(45) Date of Patent: Jan. 1, 2013

(54) PERPENDICULAR RECORDING DEVICE HAVING REDUCED SENSITIVITY TO EXTERNAL FIELDS

(75) Inventors: Lijie Guan, San Jose, CA (US); Moris Dovek, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 12/927,125

(22) Filed: Nov. 8, 2010

(65) Prior Publication Data

US 2011/0058283 A1    Mar. 10, 2011

Related U.S. Application Data

(60) Continuation of application No. 12/587,160, filed on Oct. 2, 2009, now Pat. No. 7,848,062, which is a division of application No. 11/117,672, filed on Apr. 28, 2005, now abandoned.

(51) Int. Cl.
*G11B 5/10* (2006.01)
*G11B 5/39* (2006.01)

(52) U.S. Cl. .................................. 360/319; 360/320
(58) Field of Classification Search ........... 360/319–320
See application file for complete search history.

(56) References Cited

U.S. PATENT DOCUMENTS

| | | | |
|---|---|---|---|
| 5,075,280 A | 12/1991 | Pisharody et al. | |
| 5,923,502 A * | 7/1999 | Christensen et al. | 360/319 |
| 6,757,141 B2 | 6/2004 | Santini et al. | |
| 6,775,099 B2 | 8/2004 | Kuroda et al. | |
| 6,785,097 B2 | 8/2004 | Okada et al. | |
| 7,099,121 B2 | 8/2006 | Parker et al. | |
| 7,599,152 B2 | 10/2009 | Guan et al. | |
| 2001/0017753 A1 | 8/2001 | Mori et al. | |
| 2006/0067006 A1* | 3/2006 | Takagishi et al. | 360/319 |
| 2006/0092565 A1* | 5/2006 | Ho et al. | 360/126 |
| 2006/0092569 A1* | 5/2006 | Che et al. | 360/128 |

* cited by examiner

*Primary Examiner* — Joseph Feild
*Assistant Examiner* — Carlos E Garcia
(74) *Attorney, Agent, or Firm* — Saile Ackerman LLC; Stephen B. Ackerman

(57) ABSTRACT

In a read-write head, the shields can serve as magnetic flux conductors for external fields, so that they direct a certain amount of flux into the recording medium. This problem has been overcome by the addition to the shields of a pair of tabs located at the edges closest to the ABS. These tabs serve to prevent flux concentrating at the edges so that horizontal fields at these edges are significantly reduced. Said tabs need to have aspect ratios of at least 2 and may be either triangular or rectangular in shape. Alternatively, the tabs may be omitted and, instead, outer portions of the shield's lower edge may be shaped so as to slope upwards away from the ABS.

9 Claims, 3 Drawing Sheets

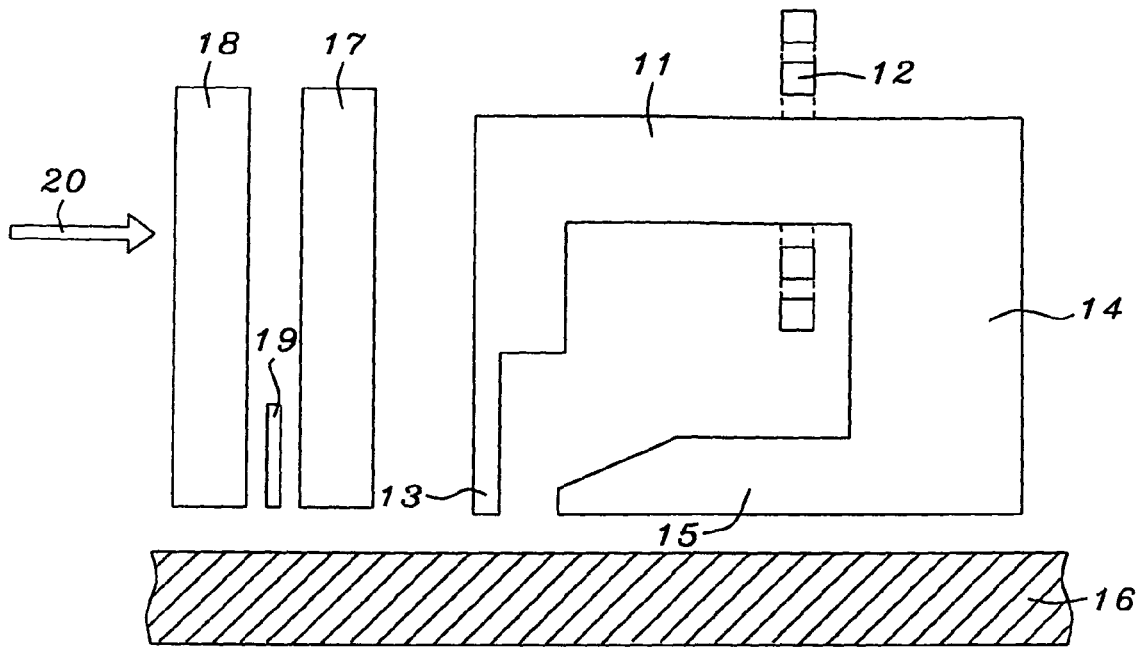
FIG. 1 – Prior Art
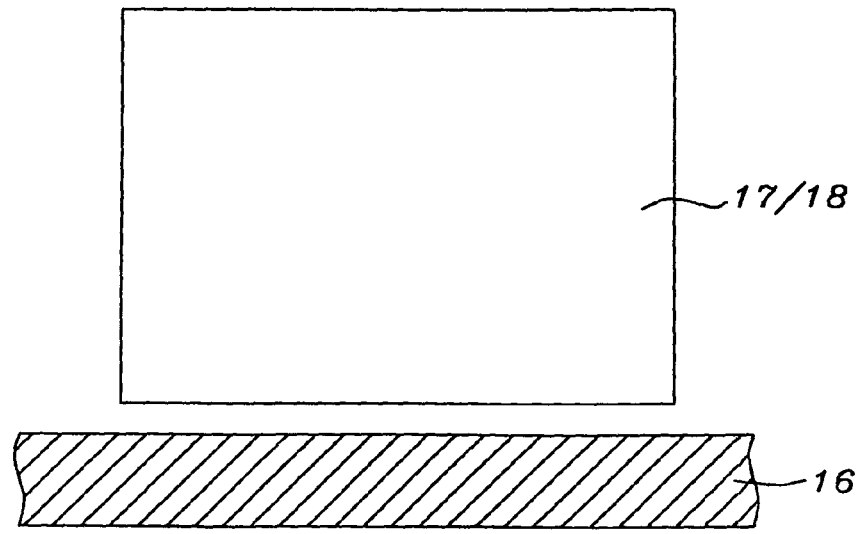
FIG. 2 – Prior Art

PERPENDICULAR RECORDING DEVICE HAVING REDUCED SENSITIVITY TO EXTERNAL FIELDS

This application is a Continuation application of U.S. application Ser. No. 12/587,160, filed on Oct. 2, 2009 U.S. Pat. No. 7,848,062, which is a Divisional application of U.S. application Ser. No. 11/117,672, filed on Apr. 28, 2005 now abandoned, both of which are herein incorporated by reference in their entirety, and are assigned to a common assignee.

FIELD OF THE INVENTION

The invention relates to the general field of magnetic disk systems with particular reference to magnetic write heads for perpendicular designs and their sensitivity to external magnetic fields.

BACKGROUND OF THE INVENTION

As magnetic recording is pushed to higher areal densities, perpendicular recording may offer advantages in thermal stability over longitudinal recording, thus delaying arrival at the super-paramagnetic limit. Another advantage of perpendicular recording with single pole (SP) head and perpendicular media, with a soft underlayer (SUL), is the ability to produce a larger write field than that of a ring head to record on relatively thick media with high anisotropy constant.

A typical read-write unit is illustrated in FIG. 1. Seen there are yoke 11, write coil 12, return shield 14, and lower write shield 15. Writing is performed in the vertical direction by write pole 13 into soft underlayer and recording medium 16 (shown as a single layer) for the PMR (perpendicular magnetic recording) configuration shown here. Reading is performed by unit 19 which is typically a giant magneto-resistance (GMR) or a tunneling magnetic junction (TMJ) device.

The magnetic components of writer shield 14 as well as reader shields 17 and 18 can serve as magnetic flux conductors for external fields, so that they direct a certain amount of flux into soft underlayer and recording medium 16. When the flux density is large enough, unwanted writing or erasing can occur. Because of the magnetic softness of the shield materials, a small amount of external field can induce relatively large fields in the media and cause erasure of information on the media.

In most current PMR designs, shields 14, 17 and 18 have a strictly rectangular shape as seen in FIG. 2 which is a view of FIG. 1 along the direction of arrow 20. Due to the finite thickness and moment of the soft magnetic underlayer, flux distribution is not uniform over the surfaces of the shields. At the sharp corners and edges, the flux density can be much higher than that at the shield center. In general, data under a shield corner is usually erased first.

A routine search of the prior art was performed with the following references of interest being found:

In U.S. Pat. No. 6,757,141, Santini et al. disclose a flare on the bottom FM shaping layer and the top FM probe layer of the second pole piece where the flare point widens after the ABS. In U.S. Pat. No. 5,075,280, Pisharody et al. show surfaces of the pole portions chamfered to slope away from the plane of the recording medium. Pole shields are formed on the chamfered surfaces of the pole portion of the core.

Parker et al. teach a shield having an edge adjacent to the ABS in U.S. Patent Publication 2003/0227714 while Okada et al. describe a recessed shield to prevent leaking of the magnetic field in US Patent Publication 2003/0026039. Kuroda et al. show a shield formed to a required shape in US Patent Publication 2003/0021063 and Mori et al. teach patterning a shield layer to an appropriate size in US Patent Publication 2001/0017753.

SUMMARY OF THE INVENTION

It has been an object of at least one embodiment of the present invention to provide a magnetic read-write head.

Another object of at least one embodiment of the present invention has been that said read-write head be insensitive to the presence of external magnetic fields.

A further object of at least one embodiment of the present invention has been to provide a method for forming said read-write head.

These objects have been achieved by:
1) The addition of a pair of tabs located at the edges closest to the ABS. Said tabs need to have an aspect ratio of at least 2 and may be either triangular, rectangular, other polygon in shape.
2) Removal of sharp edges so as to create a shallow recess angle, said removed region needs to have an aspect ratio of at least 2.
3) Any combination of (1) and (2)

BRIEF DESCRIPTION OF THE DRAWINGS

FIG. 1 shows a magnetic read-write head of the prior art.
FIG. 2 shows a read element shield of the prior art.

DESCRIPTION OF THE PREFERRED EMBODIMENTS

Figure 3:
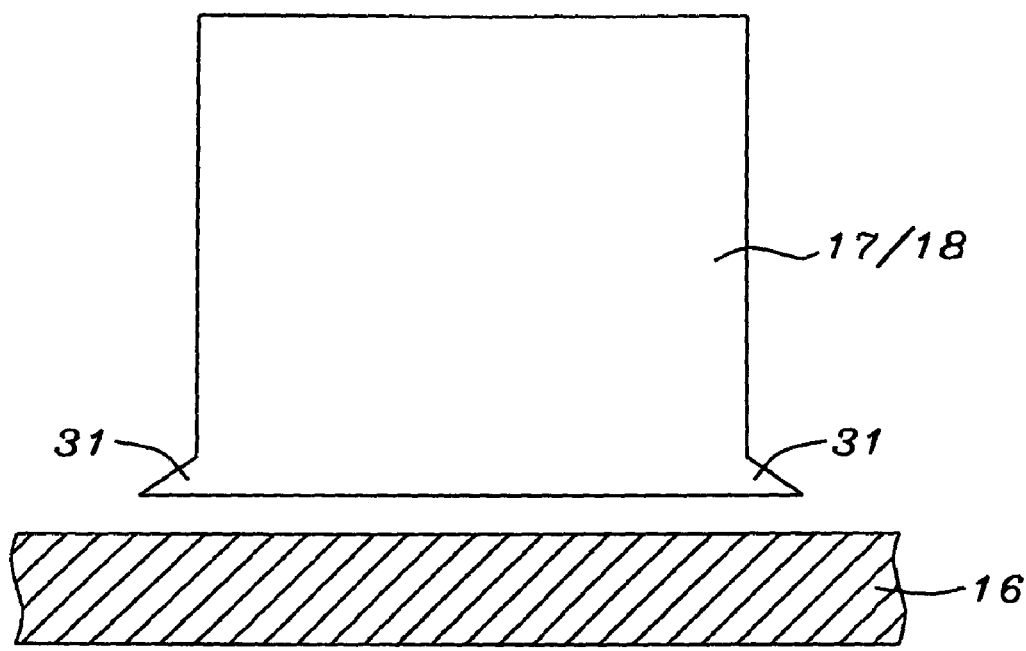
FIG. 3 shows a pair of triangular tabs appended to a shield.
Figure 4:
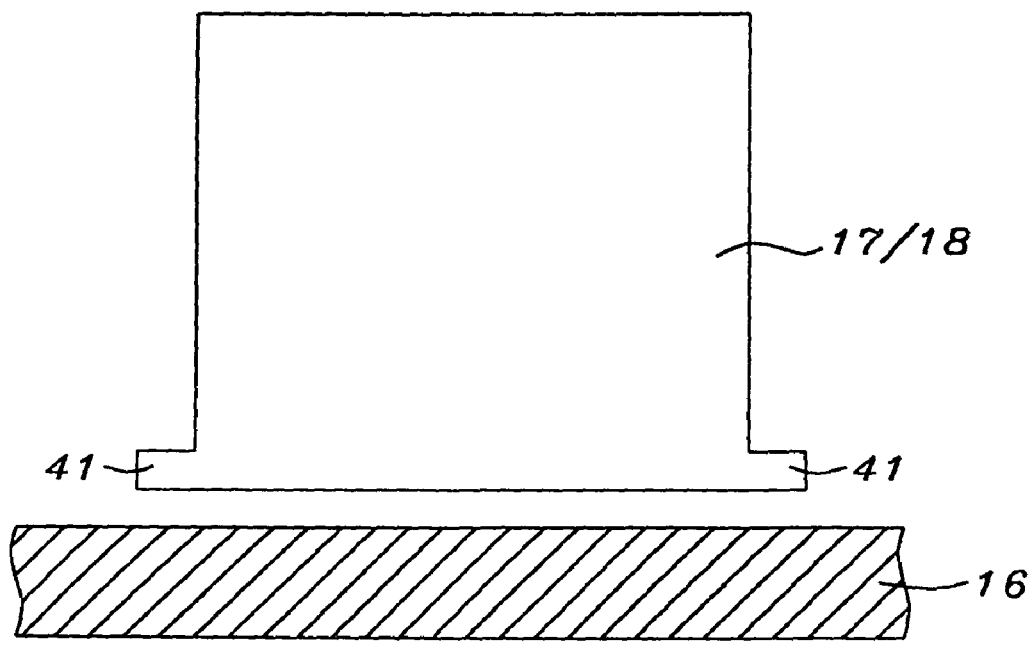
FIG. 4 shows a pair of rectangular tabs appended to a shield.
Figure 5:
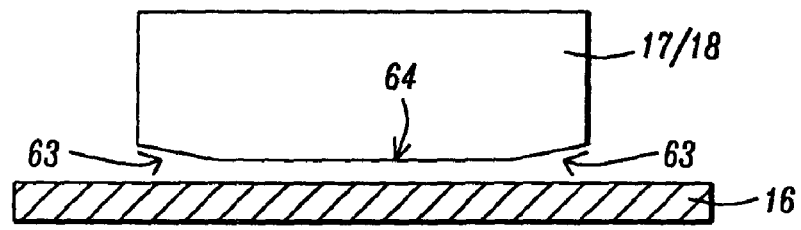
FIG. 5 illustrates a recessed edge.
Figure 6:
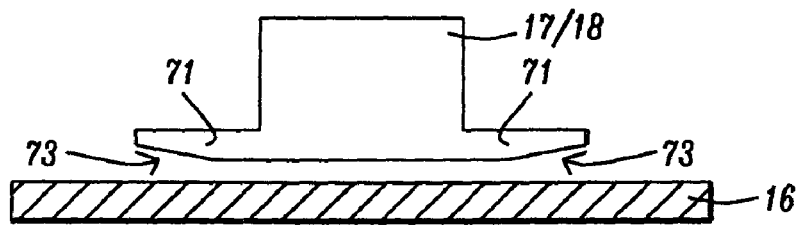
FIG. 6 illustrates a shield having both a tab and a recessed edge.

The present invention solves the problem of excessive fields at shield edges by modifying their shape to include extra tabs or to create recessed edges at their lower (ABS) edges. In the case of extra tabs, the shape of these tabs may be either triangular (as in tabs 31 in FIG. 3) or rectangular (as in tabs 41 in FIG. 4). In the case of recessed edges, the angle of recessed edges is a constant, with respect to the ABS line (as shown in FIG. 5. Typically, the angle of the slope would be between about 8 to 20 degrees and outer portion 63 should constitute less than 30% of shield width. FIG. 6 shows yet another embodiment which is a combination of tabs (71) and recessed edge (73).

Figure 7:
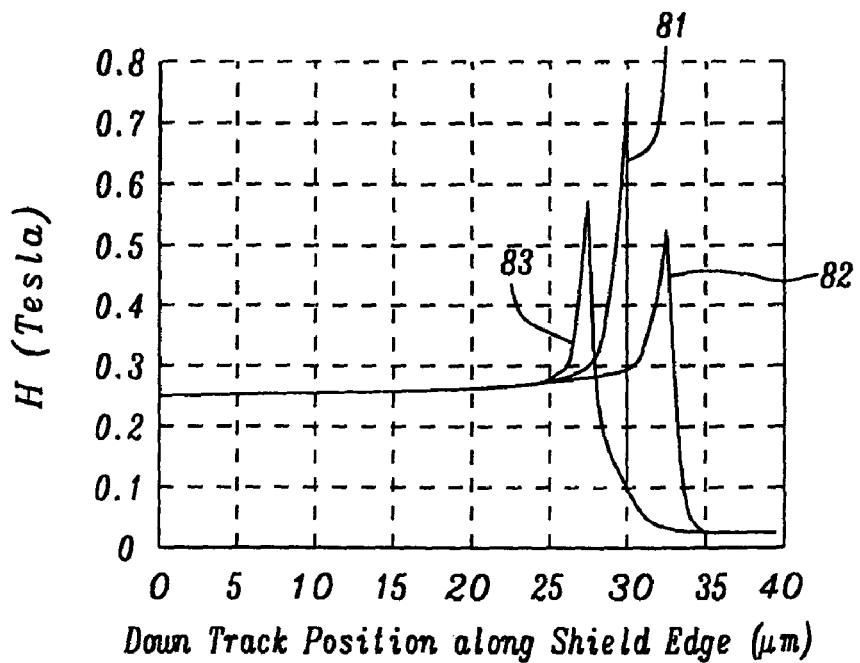
FIG. 7 shows plots for the structures seen in FIGS. 3 and 5.

In FIG. 7, the magnetic field in the media under a constant external field of 200 Oe is plotted as a function of position along the shield for a conventional rectangular shield (curve 81), a shield with triangular tab (curve 82), and a shield with a recessed edge (curve 83). It is clear that the peak of the magnetic field occurs at the edge of the shield.

By introducing the tab, or a recessed edge, the concentration of flux at the edge is avoided and fields at the edges can be significantly reduced. In the calculation shown in FIG. 7, a length of L of 3 microns and a height H of 1 micron were used for the triangular tab (curve 82) and for the recessed edge (curve 83). In both cases, the erasing field at the outer edge of the tab or recessed edge is smaller than the field at the shield center. As already noted, for the tab or recessed edge to be effective, a larger valued of L/H is preferred.

To enable full reproduction of the invention, the following additional information is provided:

Each tab has a length that is at least 2 times its height
The height of each tab is between about 0.1 and 10 microns
The length of each tab is between about 0.2 and 20 microns
Each tab is made of the same material and thickness as its associated shield
Each recessed edge has a slope angle between 5 and 20 degrees
Each recessed edge has a recessed length of between about 0.2 and 20 microns.
Suitable materials for the shield include Ni, Fe, Co alloys, such as NiFe, CoFeNi.
Each shield has a height that is between about 10 and 50 microns
Each shield has a thickness that is between about 0.5 and 5 microns

What is claimed is:

1. A magnetic read-write head, comprising:
a perpendicular magnetic writer having an ABS;
a magnetic read head having an ABS that is coplanar with said writer ABS;
magnetic reader and writer shields on opposing sides of said read head and of said write head;
all shields having lower horizontal edges that are parallel to said ABS and opposing vertical edges that are normal to said ABS;
each shield having a magnetically soft tab extending away from each of its vertical edges, said tabs having, at said vertical edge, a height that is less than that of their associated shield and a lower edge that is an extension of said shield's lower horizontal edge; and
each tab having a top edge that slopes towards said lower edge, meeting it at its point of termination, thereby giving each tab a triangular shape.

2. The magnetic read-write head described in claim 1 wherein each tab has a length that is at least 2 times its height at said vertical edge.

3. The magnetic read-write head described in claim 1 wherein each tab has a length that is between about 0.2 and 20 microns.

4. The magnetic read-write head described in claim 1 wherein the height of each tab at said vertical edge is between about 0.1 and 5 microns.

5. The magnetic read-write head described in claim 1 wherein each shield has a height that is between about 10 and 100 microns.

6. The magnetic read-write head described in claim 1 wherein each tab is of the same material and thickness as its associated shield.

7. The magnetic read-write head described in claim 1 wherein each of said shields is selected from the group consisting of Ni, Fe, Co, NiFe, and CoFeNi.

8. The magnetic read-write head described in claim 1 wherein said read-head is a GMR read head or a MTJ read-head.

9. The magnetic read-write head described in claim 1 wherein each of said shields has a thickness between about 0.5 and 5 microns.

* * * * *